US011166309B2

(12) United States Patent
Aijaz et al.

(10) Patent No.: US 11,166,309 B2
(45) Date of Patent: Nov. 2, 2021

(54) SIMULTANEOUS TRANSMIT AND RECEIVE OPERATION IN WLANS

(71) Applicant: Kabushiki Kaisha Toshiba, Minato-ku (JP)

(72) Inventors: Adnan Aijaz, Bristol (GB); Parag Kulkarni, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 220 days.

(21) Appl. No.: 15/716,157

(22) Filed: Sep. 26, 2017

(65) Prior Publication Data

US 2019/0098662 A1    Mar. 28, 2019

(51) Int. Cl.
| | |
|---|---|
| *H04W 72/04* | (2009.01) |
| *H04W 74/08* | (2009.01) |
| *H04L 5/14* | (2006.01) |
| *H04W 72/12* | (2009.01) |
| *H04W 84/12* | (2009.01) |
| *H04W 28/24* | (2009.01) |

(52) U.S. Cl.
CPC ....... *H04W 74/0808* (2013.01); *H04L 5/1461* (2013.01); *H04W 72/1231* (2013.01); *H04W 72/1263* (2013.01); *H04W 28/24* (2013.01); *H04W 84/12* (2013.01)

(58) Field of Classification Search
CPC .......... H04L 5/1461; H04W 28/24; H04W 72/1231; H04W 74/0808; H04W 84/12
See application file for complete search history.

(56) References Cited

U.S. PATENT DOCUMENTS

| 8,355,389 | B2 * | 1/2013 | Kasslin | H04L 41/083 |
| | | | | 370/338 |
| 9,961,719 | B2 * | 5/2018 | Fang | H04W 84/047 |
| 2011/0021153 | A1 * | 1/2011 | Safavi | H04B 7/0434 |
| | | | | 455/63.1 |
| 2014/0334387 | A1 * | 11/2014 | Doppler | H04W 74/0816 |
| | | | | 370/329 |
| 2017/0118771 | A1 * | 4/2017 | Kazmi | H04W 74/0808 |
| 2017/0150492 | A1 * | 5/2017 | Ozaki | H04L 5/0044 |
| 2017/0272146 | A1 * | 9/2017 | Matsuo | H04W 76/14 |
| 2019/0007971 | A1 * | 1/2019 | Yoshimura | H04L 27/0006 |

OTHER PUBLICATIONS

Adnan Aijaz, et al., "Protocol Design for Enabling Full-Duplex Operation in Next-Generation IEEE 802.11 WLANs", IEEE System Journal, 2017, 13 pages.

* cited by examiner

*Primary Examiner* — Phuc H Tran
(74) *Attorney, Agent, or Firm* — Oblon, McClelland, Maier & Neustadt, L.L.P.

(57) ABSTRACT

An IEEE 802.11 compatible processor configured to identify, using an indication received from a first station in a network and from among a plurality of further stations within the network, a second station to transmit data to during receipt of a next transmission from the first station using information indicating which stations amongst the further stations data can be transmitted to while receiving data from the first station; and information regarding the duration required to transmit next data scheduled to be transmitted to the second station, wherein the indication is an indication of the duration of the next data transmission scheduled to be transmitted by the first station.

9 Claims, 6 Drawing Sheets

SIMULTANEOUS TRANSMIT AND RECEIVE OPERATION IN WLANS

FIELD

Embodiments described herein relate generally to the full duplex operable IEEE 802.11 capable devices and networks thereof as well as methods of operating such devices and network.

BACKGROUND

Due to recent advances in analogue and digital self-interference cancellation techniques, full-duplex (FD) radios, that can simultaneously transmit and receive, can be practically realised. The FD transceiver differs from its half-duplex (HD) counterpart in that it uses self-interference cancellation methods to eliminate the interference from the signal it sends, so as to be able to successfully receive simultaneously. The self-interference cancellation technique, however, cannot mitigate interference from other RF sources.

BRIEF DESCRIPTION OF THE DRAWINGS

In the following, embodiments will be described with reference to the drawings in which.

DETAILED DESCRIPTION

Figure 1A:
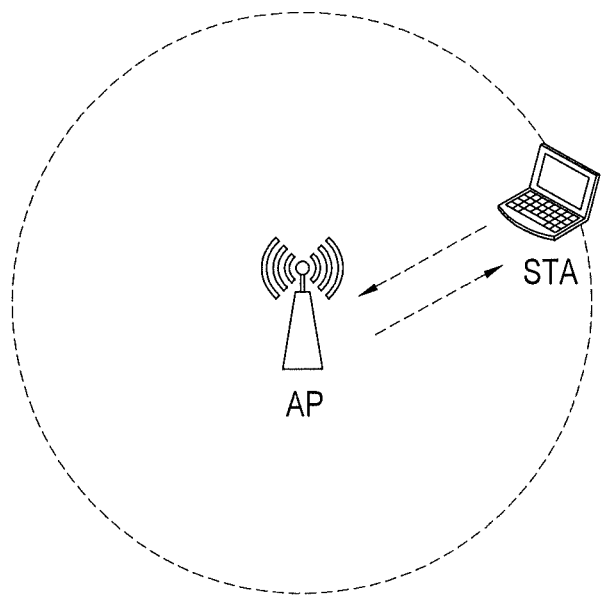
FIG. 1A shows an access point (AP) and a station (STA) operating in bi-directional Full Duplex (BFD) communication mode.

In an embodiment there is provided an IEEE 802.11 compatible processor configured to identify, using an indication received from a first station in a network and from among a plurality of further stations within the network, a second station to transmit data to during receipt of a next transmission from the first station using information indicating which stations amongst the further stations data can be transmitted to while receiving data from the first station and information regarding the duration required to transmit next data scheduled to be transmitted to the second station. The indication is an indication of the duration of the next data transmission scheduled to be transmitted by the first station.

In another embodiment there is provided an IEEE 802.11 compatible apparatus comprising the above described processor, memory storing program instructions for execution by the processor, a transmitter and a receiver. The program instructions are configured to, when executed by the processor, cause the processor to store in the memory the indication received from a first station via the receiver, perform the identifying and transmit the next data scheduled to be transmitted to the second station while the next data transmission from the first station takes place.

The program instructions may further be configured to, when executed by the processor, cause the processor to receive information from stations, the information of the strength of signals received from other stations and identifiers of said other stations.

The information can further include information of the strength of signals received from an access point.

The program instructions may further be configured to, when executed by the processor, cause the processor to receive information from stations, the information indicating those stations that can detect each other and to determine from the received information those stations that cannot detect each other.

The program instructions further configured to, when executed by the processor, cause the processor to select from among stations in communicative contact with the apparatus the second station as a station that is known to either not experience interference from the first station or a station that is known to be able to increase its carrier sense threshold such that it does not experience interference from the first station while maintaining communicative contact with the apparatus.

According to another embodiment there is provided an IEEE 802.11 compatible station comprising a transmitter, a processor and memory storing program instructions for execution by the processor. The program instructions are configured to, when executed by the processor, cause the processor to transmit during a current transmission of a data packet an indication of the duration of a data transmission scheduled after successful completion of the current data transmission.

The program instructions can be configured to, when executed by the processor, cause the processor to delay transmission of a next data packet by a predetermined number of transmission slots if it is determined that transmission of a data packet has been successful.

The program instructions can be configured to, when executed by the processor, cause the processor to transmit information identifying one or more other stations from which signals have been received, the information including one or more of an identifier identifying the one or more other stations, an indication of the strength of the signal received from the one or more other stations or a power level used by the other station in transmitting the received signal.

The program instructions can be configured to, when executed by the processor, cause the processor for periods of time during which data transmission activity from another station is expected, determine a carrier sensing threshold that allows communication with an access point without interference from the other station and to adjust the station's carrier sensing threshold to the determined carrier sensing threshold during the period of time.

In another embodiment there is provided an IEEE 802.11 compatible station comprising a transmitter, a processor and memory storing program instructions for execution by the processor, the program instructions configured to, when executed by the processor, cause the processor to, for periods of time during which data transmission activity from another station is expected, determine, based on a known strength of signal previously received from the other station, a carrier sensing threshold that allows communication with an access point without interference from the other station and to adjust the station's carrier sensing threshold to the determined carrier sensing threshold during the period of time.

The program instructions can be configured to, when executed by the processor, reduce the carrier sensing threshold to a predetermined value after the period of time.

According to another embodiment there is provided a system comprising an apparatus as described above and one or more stations as described above.

According to another embodiment there is provided a method of data transmission, comprising receiving at an IEEE 802.11 compatible apparatus a transmission from a first IEEE 802.11 compatible station including an indication of a duration of next transmission scheduled to be transmitted form the first station to the apparatus, determine, within the apparatus and from a plurality of further stations, a second station to transmit data to during the next transmission from the first station using information stored in the apparatus indicating which stations amongst the further stations data can be transmitted to while the apparatus receives data from the first station and information regarding the duration required to transmit next data scheduled to be transmitted from the apparatus to the second station and transmit the next data scheduled to be transmitted to the second station while the next data transmission from the first station takes place.

Figure 1B:
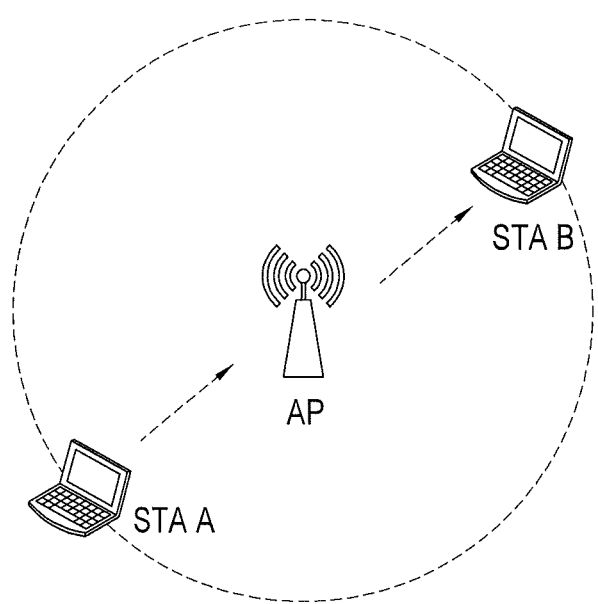
FIG. 1B shows an access point (AP) operating in unidirectional Full Duplex (UFD) communication mode receiving data from FD or half-duplex (HD) STA A and transmitting data to another FD/HD STA B.

To realise a simultaneous transmit and receive (STR) mode in 802.11 networks, two distinct types of wireless links can be created:
  a) Bi-directional FD (BFD) in which a pair of FD-capable access point (AP) and station (STA) can simultaneously transmit/receive to/from each other (a link of this nature is illustrated in FIG. 1A), and
  (b) Uni-directional FD (UFD) in which the AP can simultaneously transmit to a FD or half duplex (HD) STA while receiving from another FD/HD STA (a link of this nature is illustrated in FIG. 1B).

Enabling STR mode in 802.11 networks creates a number of challenges. From a practical perspective, FD nodes (APs and STAs) should be able to co-exist with the legacy HD nodes with little/no protocol modifications. FD APs and STAs should be able to discover the FD capabilities while co-existing with the legacy HD nodes. Further, BFD and UFD transmissions should be enabled without modifications to the legacy channel access mechanisms.

The unique characteristics of UFD transmission enable two HD/FD nodes to simultaneously transmit/receive to/from the AP. However, not all the nodes within the coverage of the AP can be part of the UFD transmission as some nodes within the coverage of the AP will experience interference from the STA transmitting to the AP. These nodes can consequently not receive data from the AP in a reliable fashion.

It is moreover important for nodes engaged in BFD transmission to be able to send and receive acknowledgements (ACK) for successful transmissions. In legacy 802.11 networks (HD communications), nodes expect an ACK after sending a data packet. However, in case of BFD transmission, since the data packets are sent by both nodes simultaneously, each node gets data packets before getting an ACK. This can lead to ACK timeout. The issue of ACK timeout also exists for UFD transmission and can be particularly challenging in this context.

The conventional MAC scheme in IEEE 802.11 WLANs is CSMA/CA. However, CSMA/CA is prone to collisions that degrade network performance under high node density.

In embodiments a different proposed MAC scheme of the IEEE 802.11, CSMA/ECA, including a deterministic back-off is used to construct a collision-free schedule in the distributed manner described below. In CSMA/ECA, nodes can use a deterministic back-off after successful transmissions. The use of deterministic back-off allows to construct a collision-free schedule in a distributed manner.

The description of embodiments that follows comprises a single-cell multi-user 802.11 network scenario wherein both FD and HD STAs co-exist and where CSMA/CA and CSMA/ECA nodes co-exit. The FD nodes in the cell employ analogue or digital self-interference cancellation techniques that allow BFD or UFD operation. The FD/HD STAs in the cell are configured to be capable of receiving when their respective network allocation vectors (NAV) is set. The FD/HD STAs in the cell are moreover configured to be able of adjusting their CST.

Capability Discovery

The nodes in a network of an embodiment are able to discover FD and CSMA/ECA capabilities in an autonomous manner. In the preferred embodiment the AP periodically advertises its capabilities in the beacon frame.

The 'capability information' field of the management frame is used for capability discovery by AP and STAs. The capability information field comprises two bytes, one of which is reserved. In embodiments the AP advertises its capabilities through one or more of the reserved bits. STAs with FD and CSMA/ECA capabilities similarly inform the AP of their capabilities, through the capability information field, when sending an association request frame.

Identifying Eligible Nodes

After discovering the FD capabilities, any FD-capable STA can engage in a BFD transmission with the AP and vice versa. However, not all the STAs (either FD or HD) can become part of a UFD transmission. The two nodes simultaneously served by the AP should be out of the interference range of each other.

The IEEE 802.11k amendment, introduced in 2008, supports radio resource measurement functionality for improving the performance of the network. Most of the radio resource measurements can be exchanged in a request-report fashion. The requests and reports for radio resource measurements are sent in the body of action frames. An action frame is a type of management frame that triggers an action. The IEEE 802.11k amendment defines the format and duration of radio resource measurements but does not specify when they have to be performed.

Frame measurement is a specific type of radio resource measurement which is performed in a request-report fashion. In this report, the measuring STA could report the number of frames received, the power level, and the BSSID for every transmitter address it listens to. In the embodiment, in order to acquire the neighbourhood information, the AP periodically sends the 'frame measurement' request frame to each STA in the network. The respective STAs respond with a 'frame measurement' response frames. The replying STAs structure their response such that it contains information about each neighbour of the STA sending the report, the associated power level and the BSS ID. Based on the measurements received from different STAs, the AP acquires the knowledge of eligible nodes for UFD transmission. The above mentioned IEEE 802.11k amendment has been absorbed into the IEEE 802.11n-2016 standard.

The embodiments disclosed herein acquire the knowledge required to select nodes eligible for participation in UFD transmission in a manner that is entirely standard compatible.

Exploiting CSMA/ECA for BFD Transmission

Figure 2:
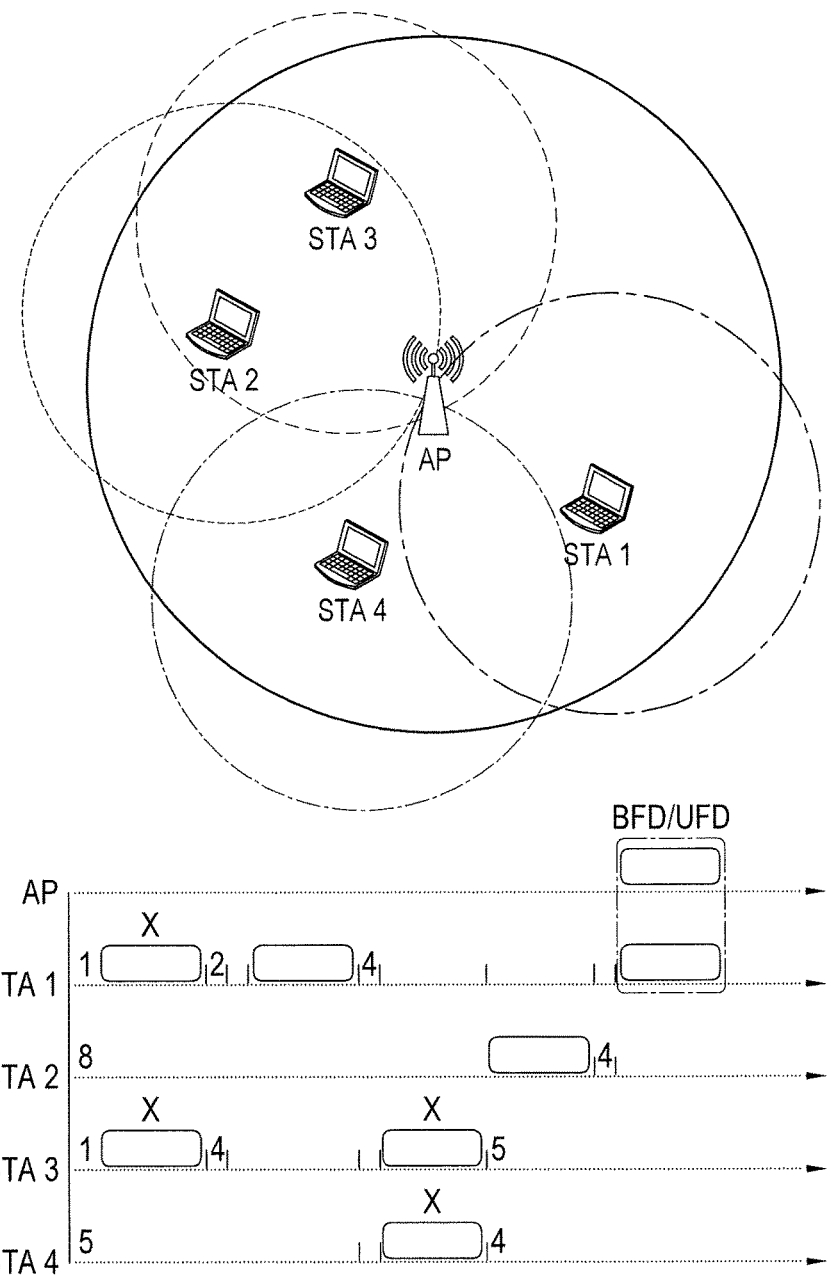
FIG. 2 shows an example of a network topology with one access point AP and four STAs alongside a BFD/UFD data transmission timeline.
Figure 3:
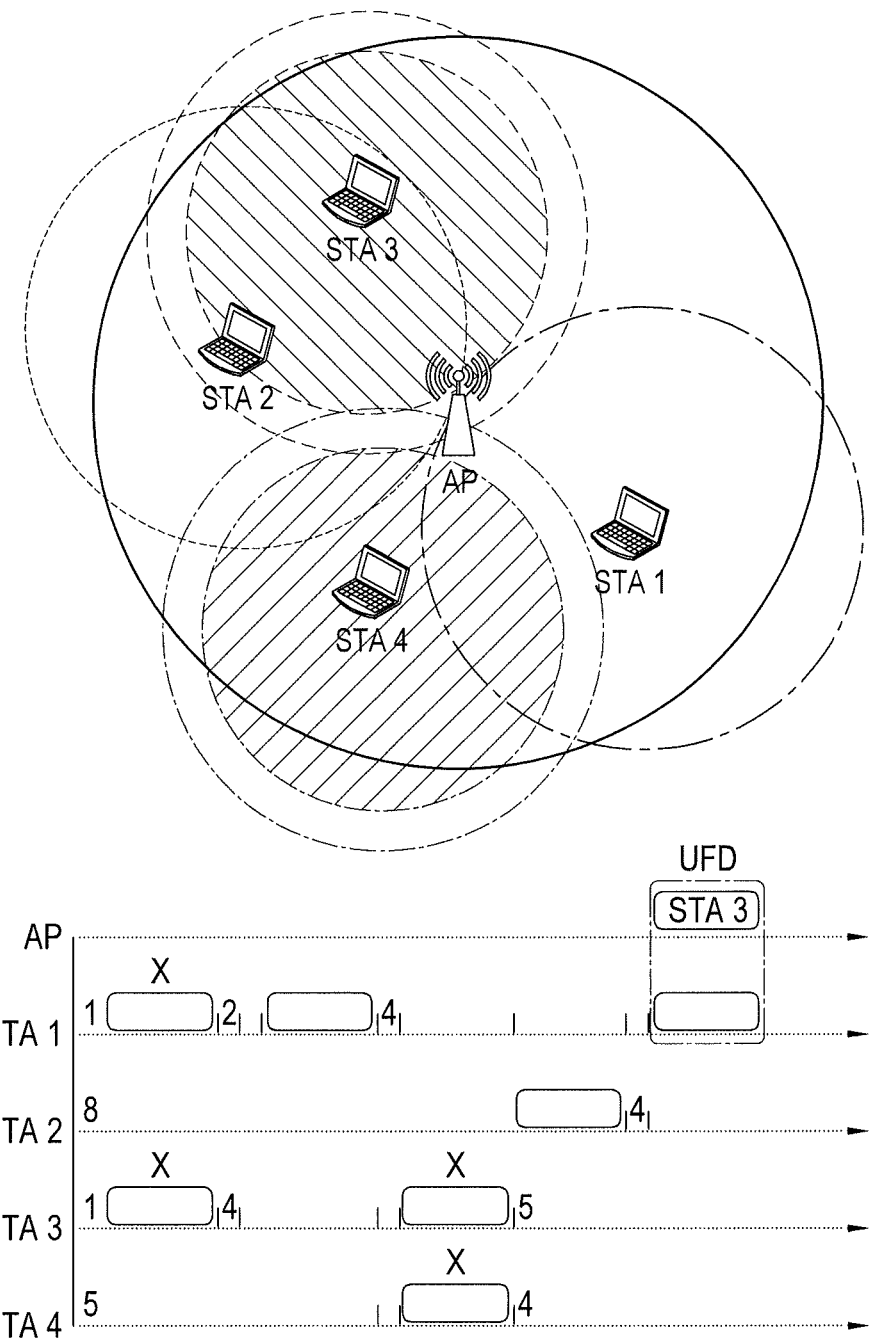
FIG. 3 shows an example of a network topology using adjusted carrier sensing thresholds alongside an UFD data transmission timeline.

In the topology and the associated timeline shown in FIG. 2 according to an embodiment all STAs support CSMA/ECA. STAs are able to carrier sense other nodes if their carrier sensing range overlaps. As can be seen from FIG. 2, the sensing range of STA 1 overlaps with those of STA 3 and STA 4 but not with that of STA 2, the sensing range of STA 2 moreover overlaps with those of STA 3 and STA 4 while the sensing ranges of STA 3 and STA 4 also overlap.

The rectangular blocks in the timeline indicate time periods in which the STAs and AP transmit data. The number preceding these time periods indicate the back-off chosen by the individual STAs, i.e. the number of transmission slots not used by the STA before the STA starts its transmission.

As can be seen from the timeline shown in FIG. 2, in the illustrated example the transmissions of STA 1 and STA 3 fail (as indicated by the "X" in FIG. 2) because of interference. Upon detection of this collision both STAs select a random back-off before re-transmitting the data (STA 1 chooses a random back-off of 2 in the example, while STA 3 chooses a random back-off of 4 in the example) according to the CSMA/CA and CSMA/ECA standard. The random back-off is uniformly distributed in the interval $[0, 1, \ldots 2^k CW_{min}-1]$, where k is the back-off stage and $CW_{min}$ is the minimum contention window.

As can be seen from FIG. 2, after the random back-off chosen by STA 1 the transmission by STA 1 is successful. According to the CSMA/ECA standard, however, upon successful completion of a transmission, an STA chooses a deterministic back-off. In an embodiment the deterministic back-off is calculated according to:

$$\text{ceil}[CWmin/2]-1$$

If CWmin is set to 10 timeslots STA 1 takes a deterministic back-off of 4 timeslots. The use of this deterministic back-off allows the AP and other STAs within range to predict when an STA that has successfully completed a transmission will attempt a next transmission.

Consider that the AP has data to send to STA 1 and STA 1 is FD-capable. The AP is also aware of the CSMA/ECA capability of STA 1. Based on the use of a deterministic back-off by STA 1, the AP knows when STA 1 is going to transmit again. Therefore, the use of CSMA/ECA provides the opportunity of a BFD transmission between AP and STA 1 through identification of potential opportunities for secondary transmission.

It will be appreciated that, if an STA or AP was to send an ACK before the AP or STA respectively that is supposed to receive the ACK is capable of receiving it the above mentioned ACK timeout problem occurs. For this reason, in the embodiment, the secondary transmission (from the AP to STA 1 in the BFD example mentioned above) is set up such that it ends before or at the same time as the primary transmission (STA 1 to AP).

Packet headers comprise a Duration ID field (referred to hereinafter as the duration field). The STAs of an embodiment use this field to indicate the duration of the (primary) transmission started by the STA. If the AP has data to be sent back to the transmitting STA in a BFD transmission then the AP uses the duration information to simultaneously send data back to the STA that has instigated data transmission (in the example shown in the timeline of FIG. 2 this is STA 1). The transmission time of the secondary transmission from the AP to the STA in particular depends on the payload and the modulation and coding scheme (MCS) used for transmission. Therefore, the AP selects the payload and MCS for the secondary transmission so that it is ensured that the secondary transmission completes at or before completion of the primary transmission.

Exploiting CSMA/ECA for UFD Transmission

In the following UFD transmissions are discussed by way of example and with reference to the network topology shown in FIG. 2. In the example the AP does not have data to send to STA 1 when STA 1 retransmits after expiry of the above discussed deterministic back-off. However, the AP has data to send to STA 2. Based on the previously collected information on network topology the AP knows that STA 1 and STA 2 are out of each other's carrier sensing ranges and do consequently not interfere and consequently identifies that the period during which STA 1 transmits to the AP can be used for parallel transmission of data by the AP to STA 2.

As discussed above, STA 1 specifies the duration of its primary transmission to the AP in the duration field of the packet header. Using this information, the AP determines the payload and modulation and coding scheme (MCS) to be used for a secondary transmission from the AP to STA 2 to ensure that the secondary transmission is completed at the same time or before the primary transmission.

Look up operations performed by the AP for selecting a suitable STA to engage in a secondary transmission and for selecting a suitable packet that can be transmitted in the secondary transmission using a MCS that fulfils the above discussed timing requirements can be computationally expensive, potentially to the extent that the secondary transmission opportunity is missed altogether. To reduce the likelihood of missing such opportunities in the embodiment the CSMA/ECA capable STA's exploit their ECA capability and include duration information (referred to as $D_{next}$ and of course dependent on the packet size as well as the MCS chosen by the STA for the next transmission) for the next packet the STA has scheduled or buffered for sending to the AP. $D_{next}$ can be carried in any of the reserved fields of the packet header. This maintains full backwards compatibility as any legacy nodes simply ignore the content of reserved fields. In an alternative embodiment STA 1 transmits information indicating the payload of the next packet to be transmitted, instead of the duration information. In this case, the AP is configured to compute the duration of the next transmission from STA 1 under the assumption that the next packet will arrive at the same MCS used in the current transmission from STA 1. Thus, it does not matter whether duration or Payload is advertised by STA1.

At the point in time when the AP receives a current packet from STA 1 (i.e., if the transmission of STA 1 is successful) the AP knows the time at which STA 1 is going to transmit again, owning to the above described deterministic back-off. The AP consequently has enough lead time for determining a node eligible for participation in UFD transmission as well as for determining a packet that can be transmitted in any such UFD transmission within the available time $D_{next}$.

STA 1 is configured to take the above described deterministic back-off when receiving an ACK from the AP after successful completion of a first transmission. After the back-off STA 1 starts the next transmission to the AP. Since the AP knows the start time of this transmission, it starts transmitting the packet it had previously selected for sending in a UFD transmission to the secondary receiver at the same time as STA 1 is transmitting the packet associated with the previously submitted duration $D_{next}$ to the AP.

If the secondary transmission succeeds there is a clear benefit over the legacy half duplex approach as medium utilisation is improved. If the secondary transmission fails the performance is the same as the legacy half duplex approach. Overall the proposed mechanism for scheduling UFD transmissions consequently provides a performance improvement, given that the signalling of the duration of the next transmission within the packet header of the first transmission by a CSMA/ECA capable node ensures maximum utilisation of the secondary transmission opportunity.

Figure 4A:
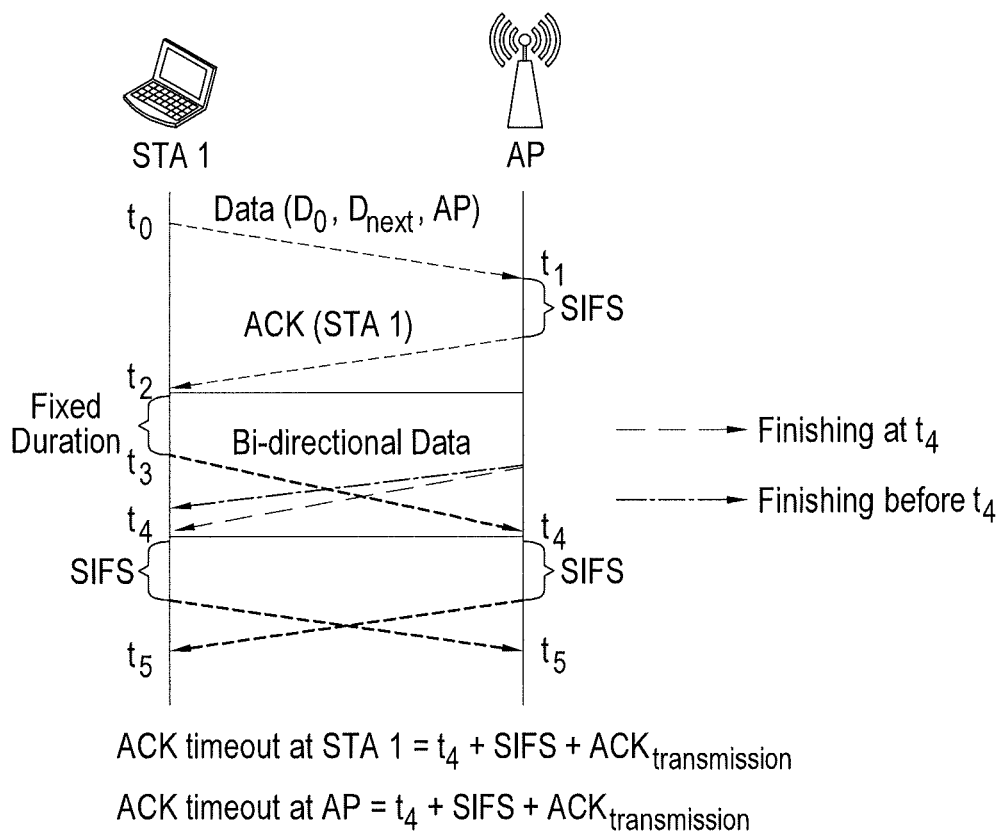
FIG. 4A shows the exchange of signals between a station and an AP in BFD mode.

The data exchanges involved in establishing a BFD data transmission are illustrated in FIG. 4A.

Consider that at time $t_0$ STA 1 transmits a first data packet to the AP as shown in FIG. 4A. Three fields associated with this first packet in FIG. 4A are the duration of the current transmission $D_0$, the duration of the next transmission $D_{next}$ that STA 1 has scheduled to make and the destination address (AP), respectively. The packet reaches AP at time $t_1$ and STA 1 responds with acknowledgement of receipt after waiting for SIFS duration.

After waiting for the deterministic back-off following successful data transmission, STA 1 starts transmission of the next data packet at time point $t_3$. Because STA 1 had, in the previous data transmission, informed the AP of the duration of the data transmission that start after the deterministic back-off at time $t_3$, the AP knows the time point t4 by which the next data transmission will end. With knowledge of time points t3 and t4 the AP can decide if the next data packet scheduled for transmission to STA 1 can be accommodated within the time frame made available by the transmission from STA 1 and, if so, set to transmit the data packet to STA 1, as shown in FIG. 4A. As can be seen from FIG. 4A, it is possible that the data transmission from the AP to STA1 is completed before time $t_4$. This is not problematic as it is the AP that has decided to instigate FD transmission and knows when the data transmission from STA1 is completed. As a consequence the AP knows when it can expect the ACK from STA1 and is configured to re-calculate the time point by which an acknowledgement from STA1 can be expected and will consequently not trigger an ACK timeout earlier than this time point.

Given that STA1 may expect an ACK from the AP shortly after $t_4$, the AP proceeds by selecting one or more of the payload, the MCS (modulation and coding scheme) and the time at which the data transmission is started to ensure that its data transmission to STA1 is completed before or at $t_4$. Once both data transmissions have been completed at time $t_4$ STA1 and the AP are both free to send ACK messages and, in doing so, avoid an ACK time out that, by the legacy protocol is set to occur at time point $t_4$-SIFS+ $ACK_{transmission}$.

Figure 4B:
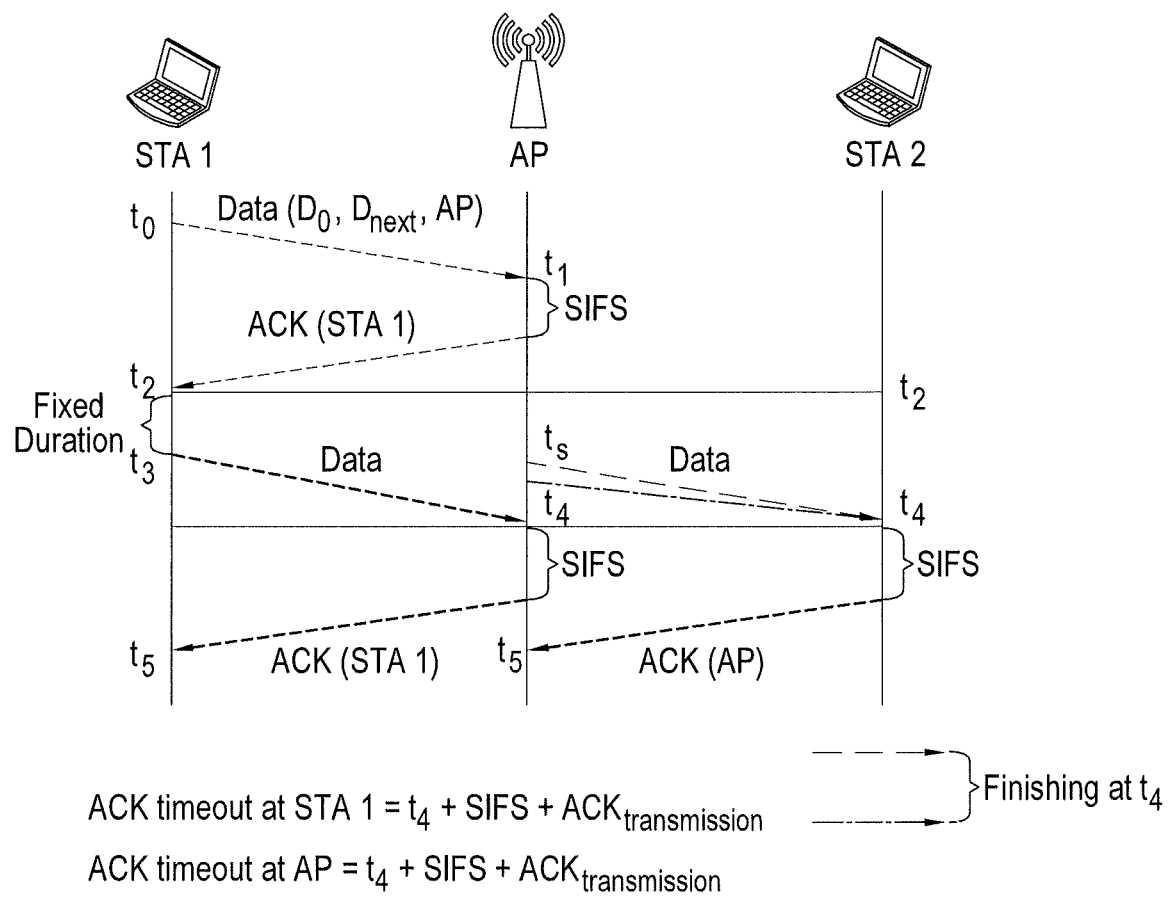
FIG. 4B shows the exchange of signals between two stations and an AP in UFD mode.

The data exchanges involved in establishing a UFD data transmission are illustrated in FIG. 4B.

At time $t_0$ STA1 sends a first packet to the AP, as shown in FIG. 4B. The format of the message sent from STA 1 to AP is the same as that discussed above with reference to FIG. 4A, followed by the AP acknowledging receipt of the packet after a time SIFS.

In this scenario the AP has data to send to STA 2 but not to STA 3 and STA 4. Therefore, the AP can potentially establish a UFD transmission. Since STA 3 and STA 4 are, as shown in FIG. 2, within the interference range of STA 1, the AP realises that it is not optimal to send data to STAs 3 and 4 whilst receiving data from STA1 in a UFD transmission.

STA1 starts transmitting data at time $t_3$, after the deterministic back-off that follows the successful transmission of the first packet. As discussed above, the AP can calculate, based on $D_{next}$ and $t_3$ the time $t_4$ at which the data transmission of the next packet from STA 1 will end. Since STA 2 is eligible to take part in the UFD transmission and the AP has data to send to STA 2, the AP sends a data message to STA 2 at or after time $t_3$ if the data packet to be sent to STA 2 can be transmitted in the available time.

The neighbouring STAs remain quiescent after finding out that the data is intended for STA 2. Therefore, a UFD transmission is successfully established by the AP. Since STA 2 can be a legacy HD node, it is particularly important that the data transmission from AP to STA 2 ends at time $t_4$. If the transmission ended before $t_4$ then STA 2 may also send ACK before $t_4$, that is whilst the AP is unable to receive the ACK as it is still receives data from STA1. Therefore, the AP is configured to select a packet whose transmission time is less than or equal to $t_4$-$t_s$ such that the chosen MCS can deliver the packet, subject to the aforementioned time constraint. The AP is configured to select the start time of transmission ($t_s$) to STA 2 so that, dictated by the payload size and the MCS, data transmission ends at $t_4$.

It will be appreciated that the AP does not need to adjust the start time of transmission for BFD transmission. This is because STA 1 is a FD-capable node that does not automatically flag an ACK timeout if it knows that BFD transmission is taking place.

Adaptive Sensitivity Control for Creating UFD Opportunities

As discussed above, a requirement for UFD transmission is that the two nodes simultaneously served by the AP are out of the carrier sensing range of each other. The AP can acquire the knowledge of eligible nodes for UFD transmissions based on the IEEE 802.11k measurement request-report procedure described above. However, such a solution only provides 'identification' of eligible nodes that, by default, are outside of each other's carrier sensing range.

In an embodiment the AP is configured to advertise the CSMA/ECA and FD capabilities of the STAs in the Beacon frame. Every STA within the network consequently has information regarding the ECA and FD capabilities of other STAs in the network.

The AP is moreover configured to request frame measurement reports from all of the STAs in the network. The STAs are configured to provide these reports by return. The frame measurement reports include an indication of the power level or RSSI the STA has measured for each of its neighbours.

The AP is also configured to request link measurement reports from all of the STAs in the network. The STAs are configured to provide these reports by return. The link measurement reports include an indication of the power level or RSSI the STA has measured for its link with the AP.

The AP is configured to collate power level and RSSI information. Table 1 shows such collated information for the network topology shown in FIG. 2.

| Node Id (A) | Neighbour Id (B) | RSSI of this neighbour (B) at the node with Node Id (A) (C) | RSSI of the serving AP at the node with node Id (A) (D) | Max. allowable Carrier Sense Threshold (CST) value = min (C + Tolerance, D), where Tolerance = 5 dBm (E) |
|---|---|---|---|---|
| STA1 | STA3 | −77 dBm | −55 dBm | min(−77 + 5, −55) = −72 dBm |
| STA1 | STA4 | −55 dBm | | min(−55 + 5, −55) = −55 |
| STA2 | STA3 | −50 dBm | −45 dBm | min(−50 + 5, −45) = −45 dBm |

-continued

| Node Id (A) | Neighbour Id (B) | RSSI of this neighbour (B) at the node with Node Id (A) (C) | RSSI of the serving AP at the node with node Id (A) (D) | Max. allowable Carrier Sense Threshold (CST) value = min (C + Tolerance, D), where Tolerance = 5 dBm (E) |
|---|---|---|---|---|
| STA2 | STA4 | −65 dBm |  | min(−65 + 5, −45) = −60 dBm |
| STA3 | STA1 | −80 dBm | −55 dBm | min(−80 + 5, −55) = −75 dBm |
| STA3 | STA2 | −50 dBm |  | min(−50 + 5, −55) = −55 dBm |
| STA3 | STA4 | −70 dBm |  | min(−70 + 5, −55) = −65 dBm |
| STA4 | STA1 | −55 dBm | −35 dBm | min(−55 + 5, −35) = −55 dBm |
| STA4 | STA2 | −60 dBm |  | min(−60 + 5, −35) = −55 dBm |
| STA4 | STA3 | −70 dBm |  | min(−70 + 5, −35) = −65 dBm |

As can be seen from Table 1, neither of STA 1 and STA 2 is listed as receiving signals transmitted by the other one of STA 1 and STA 2. For the network topology shown in FIG. 2, the only eligible nodes for UFD transmission are STA 1 and STA 2. It is desirable for the AP to have a list of potential targets for STAs that could be simultaneously served in a UFD transmission. In the embodiment the AP is configured to increase the number of these potential targets to maximise UFD opportunities. The manner in which this is achieved is explained in the following by means of the example illustrated in FIG. 2 and detailed in Table 1.

If STA 1 be the primary transmitter Table 1 shows that STA 3 can hear STA 1 at −80 dBm. Thus, if the AP were to choose STA 3 as a potential target for a secondary transmission, STA 3 could hear both the primary transmission from STA 1 as well as the secondary transmission from the AP. If the UFD transmission took place under these conditions it would lead to a collision between the primary and the secondary transmission at STA 3. Such collision can be avoided by STA 3 adapting its carrier sense threshold (thereby decreasing its sensitivity) such that the transmission from STA 1 falls below the CST and is consequently ignored by STA 3. If the CST is adjusted such that STA 3 is still sensitive to receiving signals from the AP, the UFD can proceed as desired.

This can be accomplished as shown by the simple calculation in column (E) of Table 1, that is by selecting the minimum of the RSSI of a neighbour in question and the RSSI of the serving AP. When selecting this minimum a tolerance margin is added in one embodiment to the RSSI of the neighbour in question to ensure that known variations in the channel conditions do not lead to the strength of any signal present at the location of STA in question exceeding the newly selected CST. Even after adding such a tolerance margin to the RSSI of STA 1, the carrier sense threshold at STA 3 is still less than the RSSI of AP at STA 3 (high enough to be able to decode transmissions from AP). The same situation holds for STA 4 too (reducing STA 4's carrier sensing threshold can turn a deaf ear to a transmission from STA 1 but can still hear from the AP).

In an embodiment the Table 1 is maintained in each STA, for example after the AP has transmitted it to the STAs or after the AP has transmitted those parts of the table not known/detectable by individual STAs to the STAs in question. The STAs are configured to determine whether or not it is possible for individual STAs to adjust their carrier sensing thresholds as shown in column (E) of Table 1. Should the AP determine that an STA can update its CST so that it does not suffer from interference from a primarily transmitting STA then the AP considers the STA having an updated CST as a viable reception of data in a UFD transmission.

Because of the use of deterministic back-off following a successful transmission the STAs in the network know when an STA that may interfere with their reception at the −82 dBm default CST will attempt to transmit the next data packet. Each STA also knows the RSSIs of the relevant neighbouring STAs as well as that of the AP and can therefore decide, in the same manner as the AP, if it is possible to change their own CST so that the STA no longer experiences interference from the other STA that is known to transmit in a given time slot whilst at the same time being able to communicate with the AP. Should a suitable CST value exist the STA autonomously adjusts its CST value to this value at the time when the primary transmission is known to start. The STAs are configured to revert to their default CST following completion of the primary transmission, for example following receipt of the ACK sent by the AP.

It will be appreciated that whilst STAs that cannot detect signals from another STA will not be able to adjust their CST for lack of knowledge of when the other STA is due to start and finish transmitting next, this is not a problem given that the two STAs are outside of each other's interference range in any case. Those STAs that had knowledge of the planned transmission will automatically adjust their CST and return it to the default CST value, either if they have been chosen as recipient of the secondary transmission or either or both after the time period Dnext following the start of the primary transmission or upon receipt of the ACK signal from the AP at the end of the primary transmission. In the above example, both STA 3 and STA 4 consequently update their carrier threshold. As soon the primary transmission completes, all these nodes revert back to their previous carrier sensing threshold value. The fact that both STA 3 and STA 4 adjust their CST is advantageous as it allows the AP to select either of these STAs for participation in the secondary transmission. The AP consequently has increased freedom in choosing a STA for participation in data transmission according to the need for data transmission without being unduly limited by network topology. Even if the AP chooses STA 2 instead of STA 3 or STA 4, STA 3 and STA 4 simply revert back to their previous carrier sensing threshold at the end of the secondary transmission. It will be appreciated that implementation of this scheme is straightforward whilst increasing the AP's ability to select targets for secondary transmissions.

In an embodiment STAs therefore adapt their carrier sensing thresholds to turn a deaf ear to an ongoing transmission in anticipation of receiving a potential secondary transmission. This solution is particularly attractive as eligible node identification, based on IEEE 802.11k measurement request-report procedure, may not be possible if nodes comprising a network belong to different vendors. In such cases, the AP can treat all of these nodes as legacy nodes and operate normally.

It will of course be appreciated that situations exist in which a node is not eligible for being chosen as a secondary transmission target. If STA 4 in FIG. 2 was the primary transmitter, according to Table 1, STA 1 can hear STA 4 at −55 dBm. Thus, if carrier sensing threshold at STA 1 were to be reduced (−55+Tolerance=−50 dBm) it will drop below the signal level with which STA 1 can hear the AP. This would mean that if the carrier sensing threshold were to be adapted to −50 dBm, the secondary transmission (if STA 1 were to be chosen as a secondary target) is unlikely to be successful as STA 1 would not be able to hear the AP. Thus, AP will exclude STA 1 from its list of secondary targets when STA 4 is the primary transmitter. However, it is free to choose from STA 2 or STA 3 as the secondary targets, as adaptation of their carrier sensing threshold would still enable them to receive signals from the AP whilst turning a deaf ear to a transmission from STA 4.

In addition to achieving the benefits of enabling STR mode in 802.11 networks, embodiments advantageously do not require the use of handshake mechanism for initiating BFD/UFD transmissions, thereby improving the application level throughput of the network. The embodiments also provide opportunities for exploiting FD opportunities in mixed mode deployments as they support the co-existence of CSMA/ECA, legacy CSMA/CA, FD capable and legacy HD capable STAs. As discussed earlier, if an STA is FD capable, it can engage in BFD communication with the AP. In the case of a UFD, the AP is free to pick a target for the secondary receiver from amongst the eligible nodes. In an embodiment eligible nodes are the ones that do not support the proposed protocol but are 'naturally' hidden nodes of the primary transmitter. In another embodiment eligible nodes are the ones that support the proposed protocol and shrink their carrier sensing range so as to make themselves available for consideration as a target of the secondary transmission.

Figure 5:
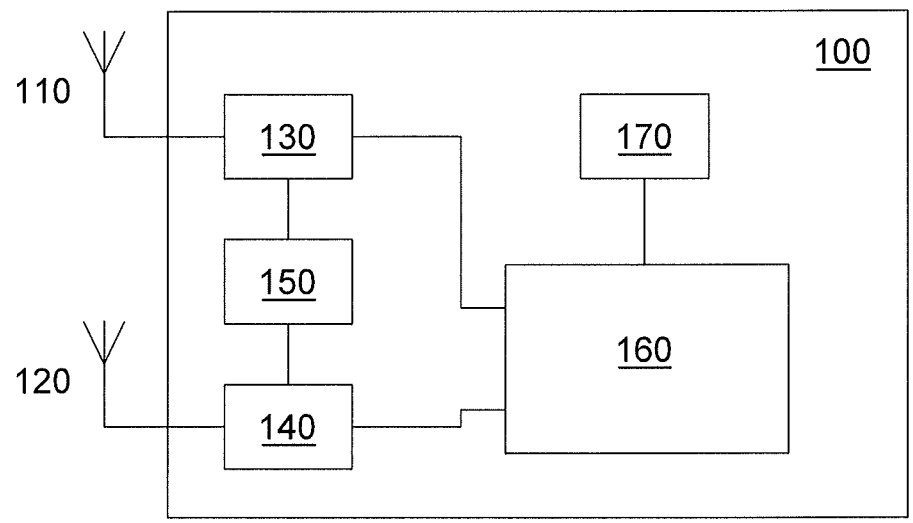
FIG. 5 shows an example of a full duplex capable access point.

FIG. 5 shows a FD AP 100 according to an embodiment. The AP comprises a transmit 110 and a receiver 120 antenna or a combined antenna used for both transmission and reception, a transmit chain 130 and a receive chain 140. A self-interference cancellation mechanism 150 is provided between the transmit chain 130 and the receive chain 140 in the embodiment. The AP moreover comprises a controller 160 and non-volatile memory 170. The controller 150 is configured to access computer program instructions stored in the memory 170 and to execute the methods described herein on the basis of these instructions.

Figure 6:
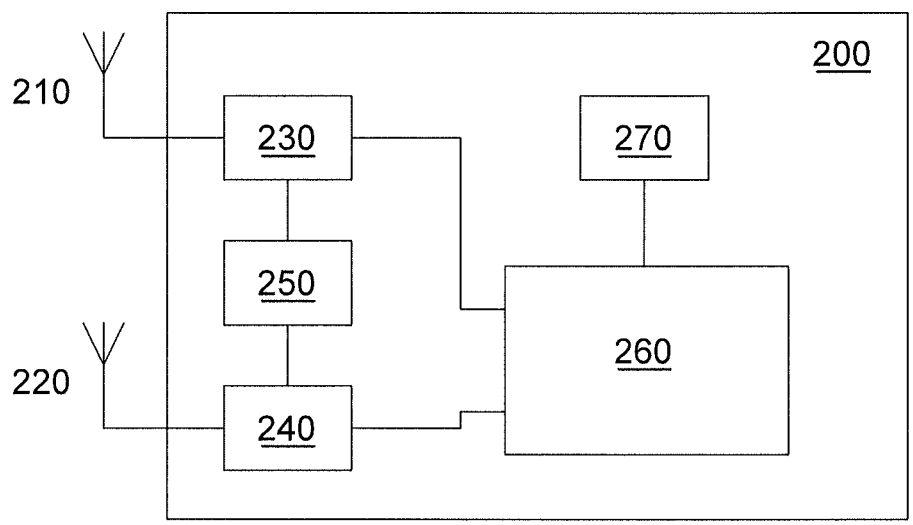
FIG. 6 shows an example of a FD capable station.

FIG. 6 shows a FD STA 200 according to an embodiment. The STA comprises a transmit 210 and a receive 220 antenna or a combined antenna used for both transmission and reception, a transmit chain 230 and a receive chain 240. A self-interference cancellation mechanism 250 is provided between the transmit chain 230 and the receive chain 240 in the embodiment. The AP moreover comprises a controller 260 and non-volatile memory 270. The controller 260 is configured to access computer program instructions stored in the memory 270 and to execute the methods described herein on the basis of these instructions.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An electronic apparatus communicable with a first station, a second station, and a third station, the electronic apparatus comprising:

processing circuitry configured to
receive, during a current transmission of the first station, information of a duration of a data transmission scheduled after successful completion of the current transmission, a transmission of a next data packet by a predetermined number of transmission slots being delayed if it is determined that the current transmission of the electronic station has been successful;
receive information identifying one or more other stations from which signals have been received, the information including one or more of an identifier identifying the one or more other stations, information of strengths of signals received from the one or more other stations or a power level used by the other station in transmitting the received signals; and
identify the second station using, information that the second station is known to either not experience interference from the first station or the second station that is known to be able to increase its carrier sense threshold such that it does not experience interference from the first station while the first station and the electronic apparatus maintaining communication, the second station being as a destination of a second next transmission of the electronic apparatus during reception of a first next transmission scheduled to be transmitted by the first station, and
transmission circuitry configured to perform the second next transmission of the electronic apparatus while the first next transmission from the first station takes place, based on either a duration of the first next transmission or information indicating payload of the first next transmission.

2. The apparatus according to claim 1, the processing circuitry is further configured to
receive information of strengths of signals received from the first station, the second station, and the third station and identifiers of the first station, the second station, and the third station.

3. The apparatus according to claim 2, wherein the information further includes information of strength of signal received from an access point.

4. The apparatus according to claim 1, the processing circuitry is further configured to
receive information from the first station, the second station, and the third station, the information indicating those stations that can detect each other; and
determine from the received information those stations that cannot detect each other.

5. The apparatus according to claim 1, wherein the processing circuitry is further configured to determine, using a rule that governs timing of subsequent transmissions of a station following a successful transmission, when a station has scheduled its next transmission and to select a further station to transmit data to during the at least part of the duration.

6. An electronic station comprising:
processing circuitry configured to:
transmit during a current transmission of electronic station information of a duration of a data transmission scheduled after successful completion of the current transmission;
delay transmission of a next data packet by a predetermined number of transmission slots if it is determined that the current transmission of the electronic station has been successful;
transmit information identifying one or more other stations from which signals have been received, the information including one or more of an identifier identifying the one or more other stations, information of strengths of signals received from the one or more other stations or a power level used by the other station in transmitting the received signals; and for periods of time during which data transmission activity from another station is expected, determine a carrier sense threshold that allows communication with an access point without interference from the other station and to adjust the station's carrier sense threshold to the determined carrier sense threshold during the period of time.

7. A system comprising:

an apparatus communicable with a first station, a second station, and a third station, the apparatus comprising:

processing circuitry configured to identify the second station using, information that the second station is known to either not experience interference from the first station or the second station that is known to be able to increase its carrier sense threshold such that it does not experience interference from the first station while the first station and the electronic apparatus maintaining communication, the second station being as a destination of a second next transmission of the apparatus during reception of a first next transmission scheduled to be transmitted by the first station; and transmission circuitry configured to perform the second next transmission of the apparatus while the first next transmission from the first station takes place, based on either a duration of the first next transmission or information indicating payload of the first next transmission, and at least one of the second station or the third station comprising circuitry configured to perform a current transmission of a data packet;

transmit information of the duration of the first next transmission scheduled after successful completion of the current transmission;

delay transmission of a next data packet by a predetermined number of transmission slots if it is determined that the current transmission of the at least one has been successful; and transmit information identifying one or more other stations from which signals have been received, the information including one or more of an identifier identifying the one or more other stations, information of strengths of signals received from the one or more other stations or a power level used by the other station in transmitting the received signals.

8. A system comprising an apparatus communicable with a first station, a second station, and a third station, the apparatus comprising:

processing circuitry configured to identify the second station using, information that the second station is known to either not experience interference from the first station or the second station that is known to be able to increase its carrier sense threshold such that it does not experience interference from the first station while the first station and the electronic apparatus maintaining communication, the second station being as a destination of a second next transmission of the apparatus during reception of a first next transmission scheduled to be transmitted by the first station; and transmission circuitry configured to perform the second next transmission of the apparatus while the first next transmission from the first station takes place, based on either a duration of the first next transmission or information indicating payload of the first next transmission, and at least one of the second station or the third station comprising transmission circuitry configured to, for periods of time during which data transmission activity from another station is expected, determine, based on a known strength of signal previously received from the other station, a carrier sense threshold that allows communication with an access point without interference from the other station and to adjust the station's carrier sense threshold to the determined carrier sense threshold during the period of time.

9. A method of data transmission in an electronic apparatus communicable with a first station, a second station, and a third station, comprising:

receiving during a current transmission of the first station information of a duration of a data transmission scheduled after successful completion of the current transmission, a transmission of a next data packet by a predetermined number of transmission slots being delayed if it is determined that the current transmission of the electronic station has been successful;

receiving information identifying one or more other stations from which signals have been received, the information including one or more of an identifier identifying the one or more other stations, information of strengths of signals received from the one or more other stations or a power level used by the other station in transmitting the received signals;

identifying the second station using information that the second station is known to either not experience interference from the first station or the second station that is known to be able to increase its carrier sense threshold such that it does not experience interference from the first station while the first station and the electronic apparatus maintaining communication, the second station being as a destination of a second next transmission of the electronic apparatus during reception of a first next transmission scheduled to be transmitted by the first station; and performing the second next transmission of the electronic apparatus while the first next transmission from the first station takes place, based on either a duration of the first next transmission or information indicating payload of the first next transmission.

* * * * *